Sept. 18, 1934.   C. A. THOMPSON ET AL   1,974,166
LIQUID SPRAY MACHINE
Filed July 29, 1932   2 Sheets-Sheet 1
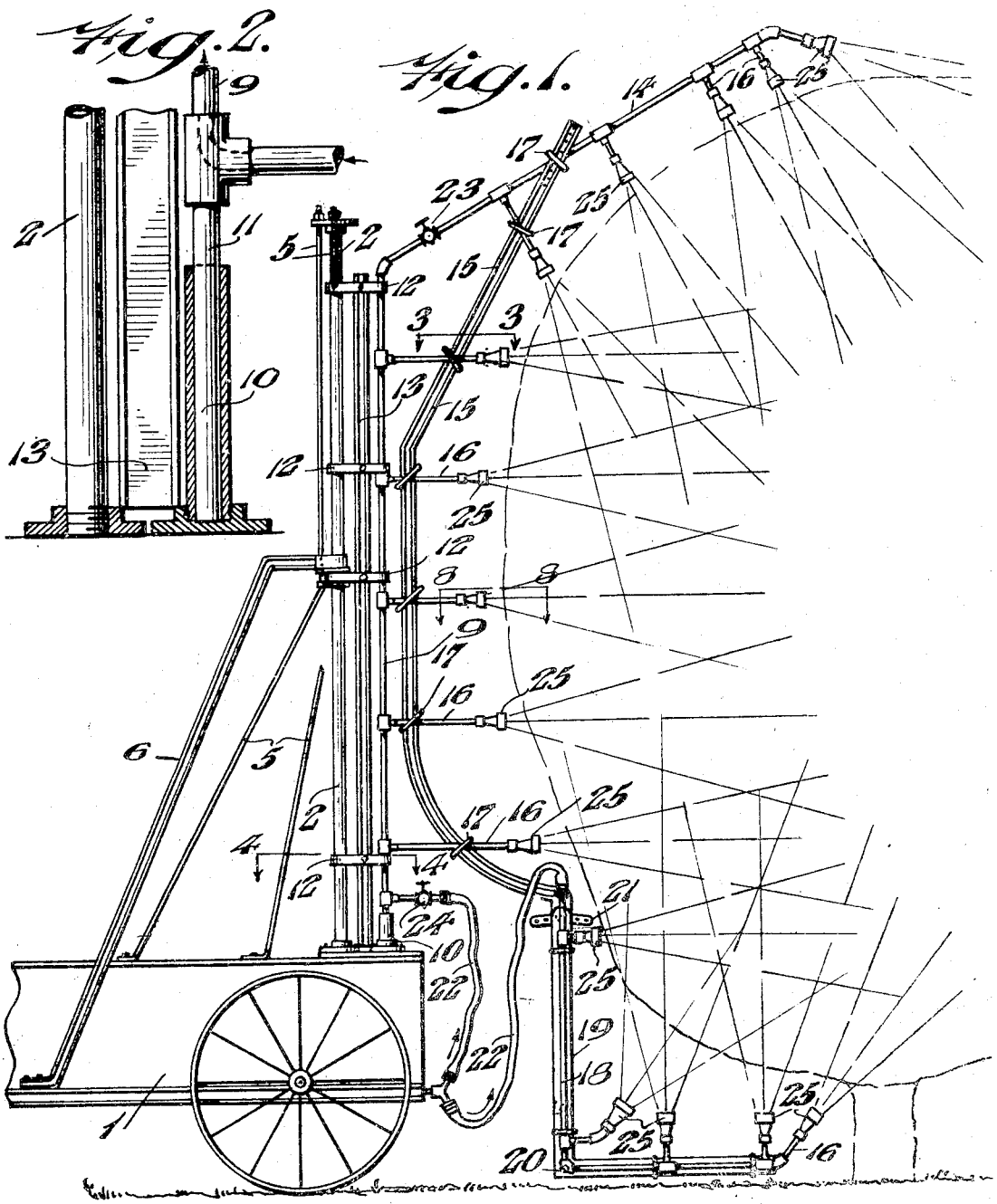
INVENTORS.
CHARLES A. THOMPSON.
RUSSELL E. UNDERWOOD,
BY Normandy Harker
ATTORNEY Sept. 18, 1934.  C. A. THOMPSON ET AL  1,974,166
LIQUID SPRAY MACHINE
Filed July 29, 1932   2 Sheets-Sheet 2
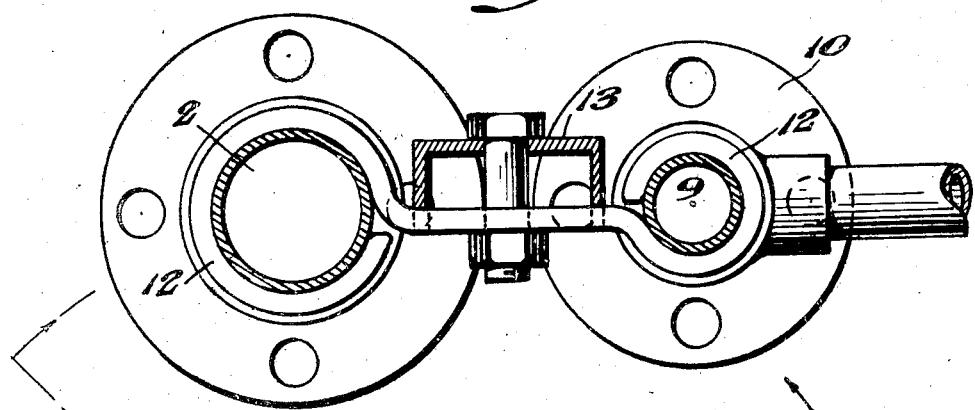
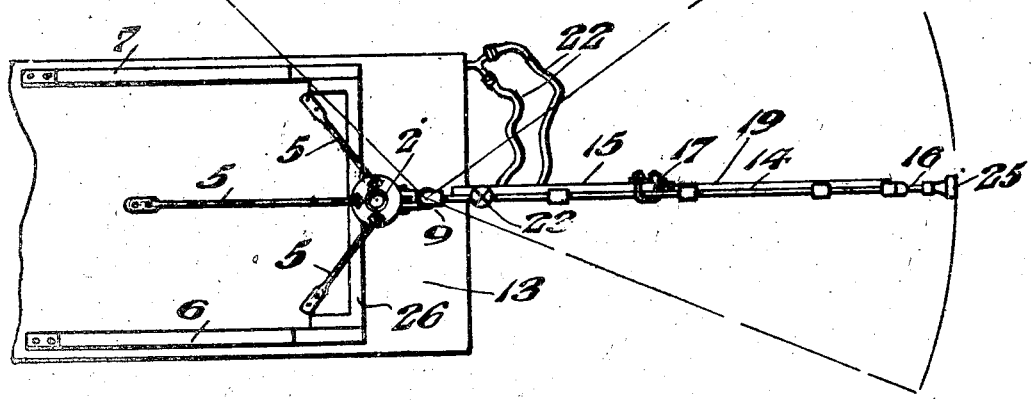
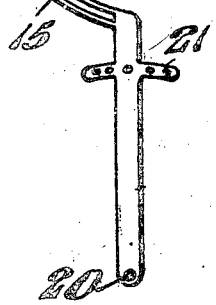
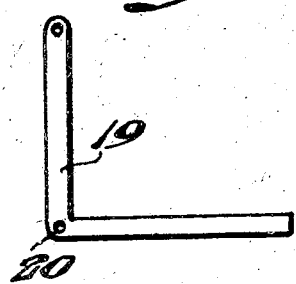
INVENTORS:
CHARLES A. THOMPSON,
RUSSELL E. UNDERWOOD,
BY Norman W Karker
ATTORNEY Patented Sept. 18, 1934

1,974,166

UNITED STATES PATENT OFFICE 1,974,166

LIQUID SPRAY MACHINE

Charles A. Thompson, Mount Holly, and Russell E. Underwood, Rancocas, N. J.

Application July 29, 1932, Serial No. 625,976

2 Claims. (Cl. 299—39)

Our invention is an upright spray device, commonly called a boom, for spraying trees or other objects and is a combination of assembled pipe, mounted, braced and pivoted in an upright position on a vehicular spraying machine in such a manner that it carries the spray liquid from pump and pressure tank of the vehicle, through pipes or hoses, or both, to outlets or nozzles arranged to conform to the general contour of the tree or object and discharge the spray upon the tree or object, enveloping a complete segment of it with a continuous whirling mist at one time.

Its advantage over spraying guns and devices now in use is the fact that it will spray a tree or line of trees with greater speed, covering more area at one time than present devices, will reach the top of the tree and the area underneath the low branches and will generate swirls of spray and mist which will reach the underside and all portions of the leaves and branches more efficiently and completely. The operation of our device permits a saving of time over the operation of devices now used in the trade, in that it can be operated from a propelled vehicle, which carries it through an orchard of trees, along the rows, with little or no halt or delay in the vehicle's progress, turning the apparatus toward the tree as it is approached, directly at it when opposite and backward toward it as the tree is being passed and then forward toward the next tree. On turning the vehicle at the end of any tree row being sprayed, in order to direct the spray in the same direction on the second row, it is only necessary to swing the pipe boom on its pivot to the opposite side of the vehicle and continue uninterrupted without any loss of time. It is particularly useful in the spraying of fruit trees but its use is not restricted to fruit trees but may be employed on any tree or object of any kind where spraying is desired. The use of this device is an improvement in the technique of spraying in that each tree is halved and the spray applied over a complete segment at all necessary angles for thorough coverage. In addition, when spraying with the wind this combined mist from all outlets floats more readily through the tree covering much of the other half of the tree from the inside. The advantage of such a combined fog or mist over and through the tree at one time will enable the operator to save material and avoid "run off" or drip and shorten the time necessary to do the work.

The construction of our device is shown by the attached drawings, of which the following are detailed descriptions:

Figure 1 shows a side elevation of the device carried upon a spray pumping vehicle.

Figure 2 is an enlarged detail view partly in elevation and partly in vertical section illustrating the mounting of the mast and spray pipe, the mast being rigid while the spray pipe is capable of rotation.

Figure 3 is an enlarged section on the line of 3—3 in Figure 1.

Figure 4 is an enlarged section on the line of 4—4 in Figure 1.

Figure 5 is a plan view looking down from the top of the mast, spray boom, stays and braces and illustrates the arc in which the pipe or spray boom will pivot.

Figure 6 is a detail view in elevation of the lower end of the channel brace beam.

Figure 7 is a view in elevation of the angular channel iron which is adapted to be pivotally supported upon the lower end of the channel brace beam shown in Figure 6, and forming a support for the auxiliary spray pipe.

Figure 8 is an enlargement of the end of the spur pipe with attached nozzle.

In Figure 1, No. 1 represents any vehicular spray device now in common use, containing tank for storage of spray, pumping apparatus and other mechanical means of forcing the spray into our device.

No. 2 represents a vertical mast which is rigidly fastened upon the vehicle and may be of any appropriate material, height, strength and rigidity and held in place by appropriate braces and stays which, for illustration, we have shown in the drawing, a stay No. 5 and a brace No. 6 and No. 7. No. 9 represents the upright pipe which carries the liquid spray materials. This pipe is fitted at its base, No. 10, into a pivot seat provided by a metal carrying plate fastened securely on the vehicle, a collar and a socket into which the pipe fits and turns. The pipe is securely capped at the bottom to prevent leakage of the spray liquid and may be strengthened in its socket by an end section of hard metal, No. 11, to resist wear, and may, if advisable, be equipped with ball or other suitable bearings to insure ease in pivoting. This upright pipe, No. 9 is held to the mast by clamps or clevises constructed substantially as shown in Figure 4, which is a cross section of the mast, No. 2, pipe, No. 9, clevis, No. 12 and brace, No. 13. The clevises are each bolted to an upright channel iron, No. 13, and are fitted into notches in the channel iron. This upright channel iron, No. 13 is placed between the mast, No. 2 and the pipe, No. 9 as herein later shown and presents a rigid bearing and holding surface for the attached parts. It is in use in this position in the illustration for purposes of rigidity, but we do not limit ourselves to the structure of this or of any other of the rigidity devices, such as channel iron, No. 15, but they may be of other construction, material or arrangement for securing the bracing and rigidity of pipe arm #14. No. 9, which is the spray boom, is pivoted to turn through substantially the circumference of a circle, and will have a free sweep except as it comes into contact with other parts of the mechanism or vehicle. The sweep allowed, however, is sufficient for practical operation and all necessary directions of the spray.

Pipe No. 9 is adjustable and permits the addition of other sections at appropriate places by the usual means of removal of or inserting sections screwed in by ordinary pipe fittings and supplementary bracing. The pipe No. 9 continues as an arm, No. 14, at an angle, to extend and project above the tops of the trees. At junction of #14 and #9, the joint can be adjusted by removal of the metal coupling and the substitution of a metal coupling of a different angle. No. 15 is a channel iron or other proper support giving rigidity to the pipe, forming fastening points for the outlets, No. 16 holding and carrying the angled extension pipe at the top and the auxiliary pipe, No. 18 at the bottom, and of a similar contour as the object to be sprayed. At the points of contact between the channel iron, No. 15 and the pipe or pipe projections, No. 16 there is a U-bolt clamp, No. 17, holding them rigidly together or other suitable means of rigid attachment.

The portion of the spray pipe shown as No. 18 in Figure 1 is attached by U-bolts to a channel iron, No. 19 which for sake of convenience is shown as L shaped and these two parts are bolted together flatwise, so that they will hinge at point #20 and also fasten at segment arc, #21, to give rigidity and means for discharging the spray at the proper angles relative to the tree and also to accommodate the operation of the device to slope of land or necessary direction of mist from beneath up through the branches. The operation and adjustment of Nos. 15 and 19 is further shown in Figures 6 and 7. This auxiliary pipe, No. 18 can be swung upon its hinge or pivot, No. 20 to attain any desired angle of spray, being held in the desired position by an arc segment, No. 21 or other device with ordinary mechanical fastening. This arc segment or adjusting device may be a part of angular channel iron #19 instead of a part of channel iron #15 as drawn. It is removable when the height of the limbs makes its use undesirable. In this case, extra outlets may be substituted and nozzles added to the upright pipe, in order to get thorough covering on lower branches.

Pipes Nos. 9 and 18 are attached to the outlet of any ordinary spraying equipment at any appropriate point by means of flexible hose, No. 22. These pipes and their outlets receive the spray material under pressure from any appropriate point of discharge of the spray tank, which is carried on the vehicle.

No. 23 represents any appropriate mechanical means of shutting off the spray and a similar means is provided at No. 24 and may be inserted elsewhere at points where it seems advisable to cut off the spray from outlets of the pipe beyond such point.

No. 16 represents spur outlet pipes from the upright main pipe, No. 9 and from the auxiliary pipe No. 18, at the points indicated or other appropriate points, upon the end of each of which is attached a spray nozzle, No. 25 of usual design and construction. When the spray material is pumped and the shut offs are all opened, it permits a discharge of spray simultaneously over a complete side of the tree which is being sprayed. It directs the spray downward and upward as well as horizontally and at any points and in any direction where further spur pipes and nozzles are inserted for complete coverage of the foliage. The operation envelopes all leaves and branches on the segment of the tree being sprayed in a complete fog or mist. The spur outlet pipes carrying the nozzles are rigidly attached by U-bolts or other suitable means of attachment to channel iron, No. 13 or to any other rigid brace which may be substituted. A horizontal turn in direction of the whole pipe and spray mechanism is accomplished by swinging the upright pipe, No. 9 in its pivot by any mechanical device suitable for this operation, which may readily be carried forward for ready handling from the driver's seat of the vehicle. The slack in the hose, No. 22, permits the free turning while a continuous feed of spray material through them is uninterrupted by the rotary motion.

We claim:

1. In a spraying apparatus the combination with a vehicle having a liquid spray supply tank, of a mast supported thereon, a main supply pipe rotatably attached to said mast and having a pipe in communication therewith and extending at an angle thereto, that said pipe may conform to the side and top of an object to be sprayed, nozzles radiating from said pipes through which the liquid is sprayed, an auxiliary pipe provided with outlet nozzles for spraying the liquid upwardly and toward the liquid emitted from said main and angularly extending pipes, means for pivotally and adjustably supporting said auxiliary pipe to the main pipe, and means for supplying liquid to said main and auxiliary pipes.

2. In a spraying apparatus the combination with a vehicle having a liquid spray supply tank, of a mast supported thereon, a main supply pipe rotatably attached to said mast and having a pipe in communication therewith and extending at an angle thereto, that said pipe may conform to the side and top of an object to be sprayed, nozzles radiating from said pipes through which the liquid is sprayed, a beam connected to said main and angularly extending pipe, an L-shaped beam pivotally and adjustably connected to the lower end of said beam, an auxiliary pipe mounted on said L-shaped beam and provided with upwardly directed nozzles, said L-shaped beam forming an adjustable support for said auxiliary pipe and means for supplying liquid to said main and auxiliary pipes.

CHARLES A. THOMPSON.
RUSSELL E. UNDERWOOD.